(12) United States Patent
Changqing et al.

(10) Patent No.: US 7,541,966 B2
(45) Date of Patent: Jun. 2, 2009

(54) APPARATUS AND METHOD FOR DEMODULATING A MODULATED SIGNAL

(75) Inventors: Xu Changqing, Singapore (SG); Li Zhiping, Singapore (SG); Hu Saigui, Singapore (SG); Tan Kai Ren, Singapore (SG); Wang Tingwu, Singapore (SG); Tomisawa Masayuki, Singapore (SG)

(73) Assignee: Oki Techno Centre (Singapore) Pte Ltd, Singapore (SG)

( * ) Notice: Subject to any disclaimer, the term of this patent is extended or adjusted under 35 U.S.C. 154(b) by 0 days.

(21) Appl. No.: 11/836,138

(22) Filed: Aug. 8, 2007

(65) Prior Publication Data

US 2008/0062029 A1 Mar. 13, 2008

(30) Foreign Application Priority Data

Sep. 12, 2006 (SG) .............................. 200606231-9

(51) Int. Cl.
*G08C 19/12* (2006.01)

(52) U.S. Cl. ...................... 341/181; 341/110; 341/155; 341/174; 341/177; 375/322; 375/324; 375/326; 375/344; 455/86; 455/130; 455/311; 455/319

(58) Field of Classification Search ................ 375/322, 375/324, 326, 344; 455/86, 130, 311, 319; 341/110, 155, 174, 177, 181
See application file for complete search history.

(56) References Cited

U.S. PATENT DOCUMENTS

| | | | | |
|---|---|---|---|---|
| 5,461,646 A * | 10/1995 | Anvari | ....................... | 375/347 |
| 5,999,561 A * | 12/1999 | Naden et al. | ................. | 375/142 |
| 6,177,835 B1 * | 1/2001 | Grebowsky et al. | ......... | 329/304 |
| 6,307,877 B1 * | 10/2001 | Philips et al. | ............... | 375/130 |
| 6,343,207 B1 * | 1/2002 | Hessel et al. | .................. | 455/86 |
| 6,662,367 B2 * | 12/2003 | Dapper et al. | ............... | 725/105 |
| 6,697,609 B2 * | 2/2004 | Wakamatsu et al. | ......... | 455/260 |
| 6,879,647 B1 * | 4/2005 | Myers | ......................... | 375/336 |
| 6,961,314 B1 * | 11/2005 | Quigley et al. | .............. | 370/252 |
| 7,248,625 B2 * | 7/2007 | Chien | ......................... | 375/219 |
| 7,457,375 B2 * | 11/2008 | Soga | ........................... | 375/324 |
| 2004/0146122 A1 * | 7/2004 | Fague et al. | ................. | 375/326 |
| 2004/0151238 A1 * | 8/2004 | Masenten | ................... | 375/219 |
| 2006/0270375 A1 * | 11/2006 | Beamish et al. | ............. | 455/311 |

\* cited by examiner

*Primary Examiner*—Linh V Nguyen
(74) *Attorney, Agent, or Firm*—Rabin & Berdo, P.C.

(57) ABSTRACT

An apparatus for demodulating a modulated signal comprises an analog to digital converter (2, 12) for converting an analog modulated input signal to a digital signal. The analog to digital converter is arranged to sample the input signal at a predetermined sampling rate. A digital down converter (4, 14) then receives the digital signal at the sampling rate. The digital down converter has an associated digital intermediate frequency and reduces the frequency of the digital signal to one quarter of the sampling rate. A low pass filter (6, 16) filters selected frequencies from the digital signal. A frequency offset stage (8, 18) applies a modification to the frequency of the filtered signal to reduce frequency offset therein, and a differential demodulator (10, 20) demodulates the signal after modifying the frequency to reduce the frequency offset. There is also disclosed a method for demodulating a signal.

15 Claims, 2 Drawing Sheets

APPARATUS AND METHOD FOR DEMODULATING A MODULATED SIGNAL

BACKGROUND OF THE INVENTION

1. Field of the Invention

The present invention relates to an apparatus and method for demodulating a modulated signal.

2. Description of Related Art

Bandpass sampling techniques are popular in the field of digital intermediate frequency (D-IF) receivers. In such techniques, a main consideration is to reduce the power consumption by using a lower sampling rate. With bandpass sampling, the sampling rate can be lower than the IF frequency as long as it is higher than two times the bandwidth of a signal being processed.

Conventional bandpass sampling techniques typically oversample the signal being processed whilst undersampling the IF signal. The sampling rate of bandpass sampling should meet the following requirement:

$$\frac{2f_U}{n} \leq f_S \leq \frac{2f_L}{n-1} \quad 1 \geq n \leq \left\lfloor \frac{f_U}{B} \right\rfloor \quad (1)$$

Where $f_U$ is the highest frequency of the IF signal, $f_L$ is the lowest frequency of the IF signal, $f_S$ is the sampling rate, and B is the occupied bandwidth of the IF signal. The equivalent digital IF after sampling will be denoted by:

$$f_{DIF} = (f_{IF} - n*f_s) \quad (2)$$

where $f_{IF}$ is the analog IF of the received signal and n is an integer. Normally, the sampling rate will be set as an integer multiple of the symbol rate. Also, there are some practical considerations in the selection of analog IF signals. For example, if a conventional D-IF receiver has the following parameters $f_{IF}$=40 MHz, B=5 MHz, fsym (the data symbol rate)=2.048M; the lowest sampling rate equal to the integer multiple of the symbol rate will be 12.288 MHz (n=6) according to equation (1). The equivalent IF signal after sampling is denoted by equation (2) as follows:

$$f_{DIF} = (f_{IF} - n*f_s) = (40 - 3*12.288) = 3.136 \text{ MHz}$$

In traditional demodulators for M-ary Phase Shift Keying (MPSK) and Differential M-ary Phase shift Keying (DMPSK) signals, an analog to digital converter (ADC) is used to convert a received analog signal (either a baseband signal or an intermediate frequency (IF) signal) into digital form for further processing. For digital processing, the signal is passed through a digital down converter (DDC) and a low pass filter (LPF) before being demodulated. A problem with the hardware typically used in the conventional bandpass sampling techniques is that the DDC and the following LPF structure cannot generally be simplified.

Therefore, there is a need for a less complex and more economical apparatus and method for bandpass sampling.

SUMMARY OF THE INVENTION

An object of the present invention is to provide an apparatus and method for simplifying the hardware of a digital down converter and a low pass filter of the apparatus.

According to the above-mentioned object, an apparatus for demodulating a modulated signal is provided. The apparatus comprises an analog to digital converter for converting an analog modulated input signal to a digital signal having an associated frequency, the analog to digital converter being arranged to sample the input signal at a predetermined sampling rate; a digital down converter for receiving the digital signal from an output of the analog to digital converter at the sampling rate and being arranged to reduce the frequency of the digital signal from the predetermined sampling rate to one quarter of the sampling rate; a low pass filter for receiving an output signal from the digital down converter and for filtering selected frequencies therefrom and produce a filtered output signal; a frequency offset stage for receiving the filtered signal and for applying a modification to the frequency of the filtered signal to reduce a frequency offset in the signal, and a differential demodulator for demodulating the signal after application of the modification to reduce the frequency offset in the signal.

Preferably, the digital down converter is arranged to separate the digital signal into inphase and quadrature components, and the low pass filter is arranged to filter the inphase and quadrature components separately.

Preferably, the analog input signal has an associated symbol rate, and the predetermined sampling rate is an integer multiple of the symbol rate.

Preferably, the frequency offset stage comprises a fixed frequency offset stage for applying a fixed frequency compensation modification to the frequency of the filtered signal to reduce the frequency offset in the signal due to the frequency of the signal being reduced by the digital down converter to one quarter of the sampling rate.

In an alternative preferred embodiment, the frequency offset stage is arranged to estimate a frequency offset value indicative of drift in the apparatus and to apply a frequency correction to the frequency of the filtered signal to reduce the frequency offset in the signal, the frequency correction is based on the estimated frequency offset value and the frequency offset due to the frequency of the signal being reduced by the digital down converter to one quarter of the sampling rate.

According to the above-mentioned object, a method for demodulating a modulated signal is provided. The method comprises converting an analog modulated input signal to a digital signal having an associated frequency using an analog to digital converter, the analog to digital converter being arranged to sample the input signal at a predetermined sampling rate; applying at the sampling rate the digital signal from an output of the analog to digital converter to a digital down converter; reducing in the digital down converter the frequency of the digital signal from the predetermined sampling rate to one quarter of the sampling rate; filtering selected frequencies from an output signal from the digital down converter using a low pass filter to produce a filtered output signal; applying the filtered signal to a frequency offset stage; applying a modification to the frequency of the filtered signal using the frequency offset stage to reduce a frequency offset in the signal; and demodulating the signal using a differential demodulator after application of the modification to reduce the frequency offset in the signal.

Preferably, the method further comprises separating the digital signal into inphase and quadrature components using the digital down converter, and wherein the step of filtering the signal comprises filtering the inphase and quadrature components separately.

In a preferred embodiment, the step of applying a modification to the frequency in the frequency offset stage comprises applying a fixed frequency compensation modification to the frequency of the filtered signal to reduce the frequency offset in the signal due to the frequency of the signal being reduced by the digital down converter to one quarter of the sampling rate.

In a further preferred embodiment, the step of applying a modification to the frequency in the frequency offset stage comprises estimating a frequency offset value indicative of drift in the apparatus and applying a frequency correction to the frequency of the filtered signal to reduce the frequency offset in the signal, the frequency correction being based on the estimated frequency offset value and the frequency offset due to the frequency of the signal being reduced by the digital down converter to one quarter of the sampling rate.

According to the above-mentioned object, a receiver comprising the apparatus defined above is provided.

DETAILED DESCRIPTION OF THE INVENTION

The preferred embodiment of the present invention will be described in detail by way of following examples and with reference to the above-mentioned figures.

Figure 1:
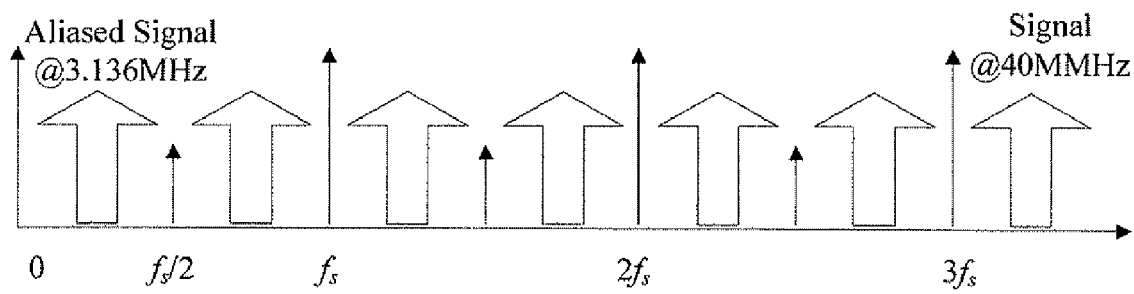
FIG. 1 is a graph showing the variation of amplitude with frequency for a conventional bandpass sampling apparatus showing the frequency components present in the apparatus.

FIG. 1 is a graph showing the variation of amplitude with frequency for a conventional bandpass sampling apparatus. The spectrum after analog to digital converter is shown for a sampling rate of 12.288 MHz. The amplitude of a positive component is shown at 3.136 MHz, 15.424 MHz, 27.712 MHz and 40 MHz. The amplitude of a negative component is shown at 9.152 MHz, 21.0440 MHz and 33.728 MHz.

Figure 2:
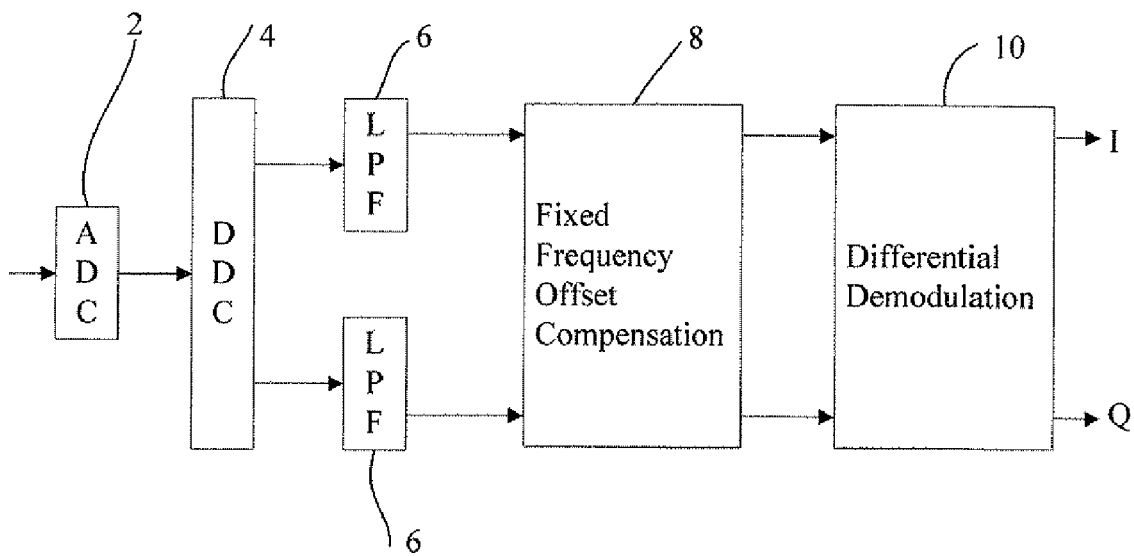
FIG. 2 is a block schematic of a digital IF receiver according to a first preferred embodiment of the present invention.

FIG. 2 shows a block diagram of a number of stages in D-IF receiver of a first preferred embodiment of the invention. The stages shown comprise an analog-to-digital converter 2, a digital down converter 4, two low pass filter stages 6, and a frequency offset compensation stage 8 and a differential demodulator stage 10. An analog modulated input signal is applied to the analog to digital converter 2 where it is sampled at a sampling rate and converted to a digital signal. The digital signal is then applied to the input of the digital down converter stage 4 which reduces the frequency of the digital signal from the sampling rate to one quarter of the sampling rate and provides inphase and quadrature component signals. These two components are passed to the two corresponding low pass filter stages 6, and the filtered outputs are applied to the fixed frequency offset compensation stage 8. The compensated outputs are applied to the differential demodulation stage 10 to produce final components which may then be further processed in other stages (not shown) to obtain a fully demodulated signal.

Figure 3:
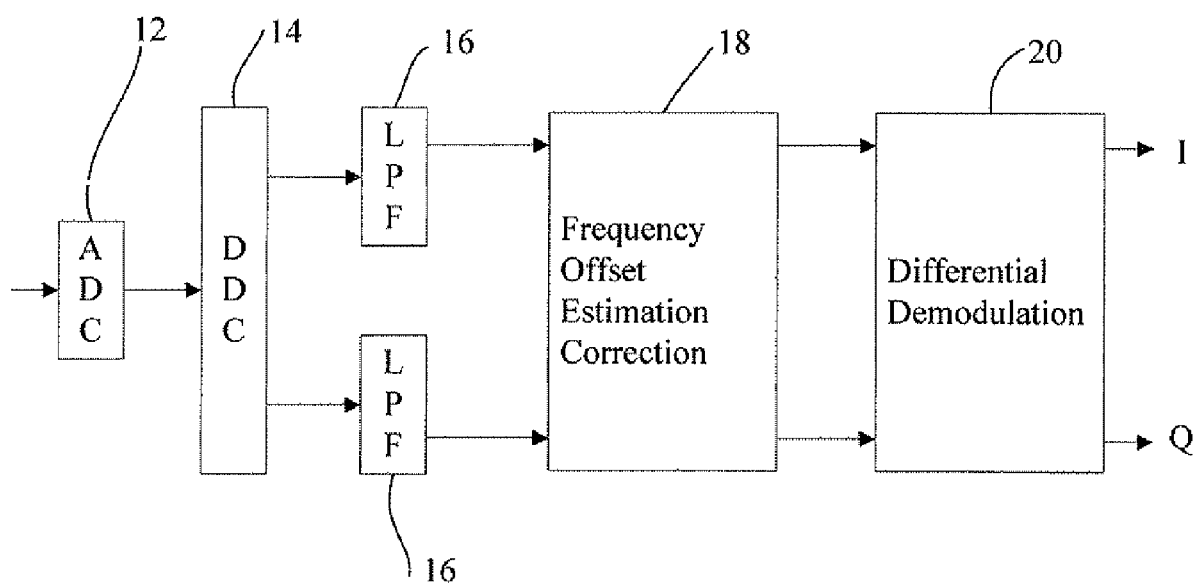
FIG. 3 is a block schematic of a digital IF receiver according to a second preferred embodiment of the present invention.

FIG. 3 shows a block diagram of a number of stages in a D-IF receiver of a second preferred embodiment of the invention. The stages shown comprise an analog-to-digital converter 12, a digital down converter stage 14, two low pass filter stages 16, a frequency offset estimation and correction stage 18 and a differential demodulator stage 20.

An analog modulated input signal is applied to the analog to digital converter 12 where it is sampled at a sampling rate and converted to a digital signal. The digital signal is then applied to the input of the digital down converter stage 14 which reduces the frequency of the digital signal from the sampling rate to one quarter of the sampling rate and provides inphase and quadrature component signals. These two components are passed to the corresponding low pass filter stages 16, and the filtered outputs are applied to the frequency offset estimation and correction stage 18. The outputs of the frequency offset estimation and correction stage 18 are applied to the differential demodulation stage 20 to produce the final I (inphase) and Q (quadrature) components which may then be further processed in other stages (not shown) to obtain a fully demodulated signal.

In operation, a D-IF receiver based on bandpass sampling may be used, for example, to demodulate pi/4 differential quadrature phase keying (DQPSK) modulated signals. Signal digitization is performed by the analog-to-digital converter stages 2 and 12. The digital IF of the digital down converter stage 4 and 14 is set to be one quarter of the sampling rate. By setting the digital IF of the digital down converter stage 4 and 14 to be one quarter of the sampling rate, according to one or more preferred embodiments of the present invention, a simplified digital down converter stage design may be achieved. This is in contrast to conventional apparatus which generally require the sampling rate to be at least greater than two times the bandwidth of the signal being processed and an integer multiple thereof, with the effect that the equivalent digital IF of the digital down converter stage is not equal to a quarter of the sampling rate, particularly when the practical limitations of analogue IF selection are also considered. This is shown from the example given in FIG. 1.

If the digital IF of the digital down converter stage is set to be one quarter of the sampling rate, the sine and cosine signals that represent the complex phasor of the digital down converter stage degenerate to two simple sequences of [1 0 –1 0 . . . ] and [0 –1 0 1 . . . ]. The frequency offset introduced into the digital down converter stage may be compensated in the fixed frequency offset compensation stage, as shown in FIG. 2, as it is a fixed frequency offset 8.

Thus, the complexity of the digital down converter stage may be reduced with appropriate selection of the sampling rate and digital IF in the digital down converter stage. Moreover, the low pass filter following the digital down converter stage may also be simplified. There is little or no performance penalty in the apparatus of FIG. 2, as the fixed frequency offset introduced by the digital down converter stage may be compensated.

Usually, frequency offset estimation and correction is necessary in wireless communication systems as there are frequency offsets caused by clock drift and Doppler shift. Therefore, as shown in FIG. 3, the pre-compensation for the fixed frequency offset inherent in the digital down converter stage 14 may be removed provided that the total frequency offset is still within the working range of the frequency offset estimation and correction stage 18. This results in a further reduction in complexity of the hardware of such an apparatus.

Thus, the one or more preferred embodiments of the present invention provide a simple and efficient apparatus and method for simplifying the hardware of down converter and filtering for D-IF receivers with bandpass sampling. Such a digital IF receiver based on bandpass sampling is particularly suitable for use in wireless communication systems.

Various modifications to the embodiments of the present invention described above may be made. For example, other components and method steps can be added or substituted for those above. Thus, although the invention has been described above using particular embodiments, many variations are possible within the scope of the claims, as will be clear to the skilled in the art, without departing from the scope of the invention.

We claim:

1. A demodulating apparatus, comprising:
   an analog to digital converter for converting an analog modulated input signal to a digital signal having an associated frequency, the analog to digital converter sampling the input signal at a predetermined sampling rate;
   a digital down converter for receiving the digital signal from an output of the analog to digital converter at the sampling rate, the digital down converter reducing the frequency of the digital signal from the predetermined sampling rate to one quarter of the sampling rate;
   a low pass filter for receiving an output signal from the digital down converter and for filtering selected frequencies therefrom to produce a filtered output signal;
   a frequency offset stage for receiving the filtered output signal and for producing a modified signal by applying a modification to the frequency of the filtered output signal to reduce a frequency offset in the filtered output signal, and
   a differential demodulator for demodulating the modified signal produced by the frequency offset stage to reduce the frequency offset in the modified signal.

2. An apparatus according to claim 1, wherein the digital down converter separates the digital signal into inphase and quadrature components, wherein the low pass filter filters the inphase component, and further comprising another low pass filter that filters the quadrature component.

3. An apparatus according to claim 1, wherein the analog input signal has an associated symbol rate, and the predetermined sampling rate is an integer multiple of the symbol rate.

4. An apparatus according to claim 1, wherein the frequency offset stage comprises a fixed frequency offset stage for applying a fixed frequency compensation modification to the frequency of the filtered output signal to reduce the frequency offset in the filtered output signal due to the frequency of the digital signal output by the analog to digital converter being reduced by the digital down converter to one quarter of the sampling rate.

5. An apparatus according to claim 1, wherein the frequency offset stage is arranged to estimate a frequency offset value indicative of drift in the apparatus and to apply a frequency correction to the frequency of the filtered output signal to reduce the frequency offset in the filtered output signal, the frequency correction being based on an estimated frequency offset value and the frequency offset due to the frequency of the digital signal output by the analog to digital converter being reduced by the digital down converter to one quarter of the sampling rate.

6. A receiver comprising the apparatus according to claim 1.

7. A demodulating method, comprising:
   converting an analog modulated input signal to a digital signal having an associated frequency using an analog to digital converter, the analog to digital converter sampling the input signal at a predetermined sampling rate;
   applying the digital signal from an output of the analog to digital converter to a digital down converter at the sampling rate;
   reducing the frequency of the digital signal from the predetermined sampling rate to one quarter of the sampling rate in the digital down converter;
   filtering selected frequencies from an output signal from the digital down converter by a low pass filter to produce a filtered output signal;
   applying the filtered output signal to a frequency offset stage;
   applying a modification to the frequency of the filtered output signal by the frequency offset stage to provide a modified signal by reducing a frequency offset in the filtered output signal; and
   demodulating the modified signal by a differential demodulator to reduce the frequency offset in the modified signal.

8. A method according to claim 7, wherein the digital down converter separates the digital signal into inphase and quadrature components, wherein the step of filtering the signal comprises filtering the inphase component, and further comprising the step of filtering the quadrature component.

9. A method according to claim 7, wherein during the step of converting an analog modulated input signal to a digital signal, the analog input signal to be converted has an associated symbol rate, and the predetermined sampling rate is an integer multiple of the symbol rate.

10. A method according to claim 7, wherein the step of applying a modification to the frequency in the frequency offset stage comprises applying a fixed frequency compensation modification to the frequency of the filtered output signal to reduce the frequency offset in the filtered output signal due to the frequency of the digital signal being reduced by the digital down converter to one quarter of the sampling rate.

11. A method according to claim 7, wherein the step of applying a modification to the frequency in the frequency offset stage comprises estimating a frequency offset value indicative of drift in the apparatus and applying a frequency correction to the frequency of the filtered output signal to reduce the frequency offset in the filtered output signal, the frequency correction being based on an estimated frequency offset value and the frequency offset due to the frequency of the digital signal being reduced by the digital down converter to one quarter of the sampling rate.

12. A demodulating method, comprising:
   converting an analog modulated input signal to a digital signal having an associated frequency using an analog to digital converter, the analog to digital converter sampling the input signal at a predetermined sampling rate;
   applying the digital signal from an output of the analog to digital converter to a digital down converter at the sampling rate;
   reducing the frequency of the digital signal from the predetermined sampling rate to one quarter of the sampling rate in the digital down converter;
   low pass filtering selected frequencies from first and second output signals from the digital down converter to produce first and second filtered output signals;
   applying the first and second filtered output signals to a frequency offset stage;
   applying a frequency modification to the first and second filtered output signals by the frequency offset stage to provide first and second modified signals by reducing a frequency offset in the first and second modified signals; and
   demodulating the first and second modified signals by a differential demodulator to reduce the frequency offset in the first and second modified signals.

13. A method according to claim 12, wherein during the step of converting an analog modulated input signal to a digital signal, the analog input signal to be converted has an associated symbol rate, and the predetermined sampling rate is an integer multiple of the symbol rate.

14. A method according to claim 12, wherein the step of applying a frequency modification comprises applying a fixed frequency compensation modification to the frequency of the first and second filtered output signals to reduce the frequency offset in the first and second filtered signals due to the frequency of the digital signal being reduced by the digital down converter to one quarter of the sampling rate.

15. A method according to claim 12, wherein the step of applying a frequency modification comprises estimating a frequency offset value indicative of drift in the apparatus and applying a frequency correction to the frequency of the first and second filtered output signals to reduce the frequency offset in the first and second filtered signals, the frequency correction being based on an estimated frequency offset value and the frequency offset due to the frequency of the digital signal being reduced by the digital down converter to one quarter of the sampling rate.

* * * * *